United States Patent [19]

Schnebel, Jr. et al.

[11] 3,819,394

[45] June 25, 1974

[54] PROTECTIVE COATING FOR ACTIVATED RESINOUS SUBSTRATES

[75] Inventors: Frederick W. Schnebel, Jr.; Edward J. Leech, both of Oyster Bay; Joseph Polichette, South Farmingdale, all of N.Y.

[73] Assignee: Photocircuits Division of Kollmorgen Corporation, Hartford, Conn.

[22] Filed: Dec. 13, 1972

[21] Appl. No.: 314,548

[52] U.S. Cl. .................... 117/6, 117/5.5, 117/47 A, 117/49, 117/54, 117/60

[51] Int. Cl. .............................................. B44d 1/14

[58] Field of Search .............. 117/47 A, 6, 47 R, 49, 117/54, 57, 63, 5.5, 212, 60

[56] References Cited

UNITED STATES PATENTS 3,628,999 12/1971 Schnebel, Jr. et al. ................ 117/6

*Primary Examiner*—Cameron K. Weiffenbach
*Assistant Examiner*—Jacqueline Ware
*Attorney, Agent, or Firm*—George B. Finnegan, Jr.; John A. Diaz; Edward A. Hedman

[57] ABSTRACT

There are provided articles of manufacture comprising bodies having outwardly presented resinous surfaces containing active bonding sites for electroless metal deposition and a strippable protective coating on the active surfaces, the coating comprising a resinous layer resistant to the penetration of external forces and substances which tend to deactivate the bonding sites and the coating being cleanly strippable from the body, preferably by applying a selective solvent for the coating material.

17 Claims, No Drawings

PROTECTIVE COATING FOR ACTIVATED RESINOUS SUBSTRATES

BACKGROUND OF THE INVENTION

1. Field of the Invention

This invention relates to protected substrates which are activated for subsequent adherent metallization. More particularly, it relates to bodies having outwardly presented resinous surfaces, which are activated with metal bonding sites, and protected against deactivation with a strippable resinous coating; and also to the method of coating such articles.

2. Prior Art

In the production of metallized plastics, various systems have been devised to enhance the adhesion of the metal layer to the plastic surfaces of decorative and industrially useful articles. If the article is to be used in a plumbing fixture which is subject to mechanical handling, heat and cold, and cleaning with abrasives, high adhesion between metal and base is important. On the other hand, if the metallized item is to function as a printed wiring circuit, which often are subject to mechanical handling and thermal warping, excellent adhesion of metal to insulating base is necessary to prevent the conductor pattern from popping loose from the substrate, e.g., during soldering, and shorting-out or breaking the electrical pathways.

When metallization is carried out by depositing a suitable metal layer from an electroless metal bath onto the activated surface of the base, adhesion will be very poor unless certain expedients known to those skilled in this art are used to prepare the surface. Among these are: (i) mechanical roughening of the surface, e.g., by sandblasting, prior to metallization; (ii) chemically treating to render the surface permanently polarized and wettable, and (iii) using adhesives. Generally, the highest bond strength both with and without the use of adhesives will be obtained by use of chemical agents for promoting the activation of bonding sites prior to their contact with an electroless metal deposition bath. Among the more successful activating methods for resins are the treatments with solutions of oxidizing agents as described in U.S. Pat. No. 3,445,350; U.S. Pat. No. 3,437,507; U.S. Pat. No. 3,533,828; U.S. Pat. No. 3,625,758; the commonly-assigned, co-pending application Ser. No. 20,106, now abandoned, filed March 16, 1970; and the commonly-assigned, co-filed application Ser. No. 314,748 filed Dec. 13, 1972.

All of the above-mentioned agents to produce resinous surfaces having active bonding sites suffer from the common disadvantage of activating the surface in such a manner that it is very sensitive to deactivation by extraneous mechanical forces, such as are encountered in handling, stacking, transporting, fabricating and storing as well as by the chemical action resulting from exposure to certain substances that are mentioned hereinafter. Once the surface has been deactivated, all of the advantages provided by application of the bond site promoting agents are lost, and only low or nonexistent bonding with subsequent metallic layers is possible.

It now has been found possible to prevent deactivation of bodies having outwardly presented surface areas of a polarized, wettable, porous nature with activated bonding sites for electroless metal deposition. Such useful articles and processes to produce them are the subject of this invention.

SUMMARY OF THE INVENTION

According to the present invention, there are provided articles of manufacture comprising a body having an outwardly presented wettable porous surface having active bonding sites for electroless metal deposition thereon, and a strippable protective coating on said surface, said strippable protective coating comprising a continuous film-forming resinous layer, said resinous layer being resistant to the penetration of external forces and substances which tend to deactivate the bonding sites and being cleanly strippable from said body.

The invention also contemplates the method of providing the new and improved articles which is, in essence, an improvement in a process for metallizing a body by means of a protective coating procedure.

The continuous film-forming resinous layer used to form the protective coating can vary rather broadly in specific chemical nature but will be characterized by being resistant to the penetration of external forces or substances which tend to deactivate the bonding sites as well as by resisting the deactivating effects of aging in storage. Thus the film will be adherent and hard or tough and free from cracks, pinholes and the like. The resinous layer will also be characterized as being cleanly strippable from the body, preferably upon application of a selective solvent for the protective coating material. Generally speaking, the aforesaid external forces involve physical or mechanical abuse of the article from handling, scratching, cutting, stacking, drilling, punching, fabricating and transporting. External substances which should be excluded by the coating will be, for example, acids, such as acetic, propionic, butyric, and the like, which are present in perspiration, oils and greases which may be carried on the fingers and hands or embodied in cutting oils and the like, ammonia, and amines and other basic reacting substances from the environment, salt air, and especially sulfur compounds such as hydrogen sulfide and sulfur dioxide which may be present in the environment from combustion gases and are notorious deactivators of bonding sites, and numerous others.

Generally speaking, the particular resin selected for the coating will be chosen for economy and efficiency from natural and synthetic substances which can form thin, continuous films of from, for example, about 10 microns to 2 to 3 mils in thickness when deposited from solution on the activated surface. The resins selected for use may be dissolved either in water or an organic solvent, and, depending on the resin, the solubility can also vary depending on the relative acidity or alkalinity of the solvent carrier medium, e.g., polyacrylic acid is much more soluble in alkaline solution. Certain protective coating materials may be heated and applied as molten liquids without dilution.

Among the preferred resins for forming the protective coating are polyacrylamides, polyacrylic acid including methyl analogs thereof, methyl cellulose, hydroxyethyl cellulose, polyvinyl alcohol, polyethylene oxide, polyethylene glycol, polyvinyl pyrrolidone, methyl vinyl ether-maleic anhydride copolymer, carboxymethyl cellulose, gelatin, casein or poly(acrylic or methacrylic)esters.

Especially preferred as film-forming resins are polyethylene glycol resins, and resinous acrylates, such as polyacrylic acids, poly(methyl methacrylate) or poly(ethylacrylate). These can be prepared by techniques known to those skilled in the art, and they are commercially available from sources to be noted hereinafter.

As will be understood by those skilled in the art, the thickness of the resin coating should be at least sufficient to provide a continuous film barrier (to prevent penetration of the external forces and substances at the critical time when protection is needed). The film thickness can be adjusted in known ways.

With a polyacrylic acid resin, for example, 8 percent resin solids in an ammoniated water vehicle provides a very thin coating of 0.1 to 0.2 mils thick, and 16 percent resin solids yields a film from 1 to 2 mils thick. Film thickness is adjusted by increasing or decreasing the concentration of resin solids.

The polyacrylates, e.g., poly(methyl methacrylate) or poly(ethyl acrylate) may be formed into films, e.g., by dipping or by spraying a solvent formulation. By way of illustration, at 10 percent resin solids, several quick spray passes will build up a film of about 0.25 mil. With 30 percent resin solids two or three spray coats will yield a final dry film thickness of about 1.0 mil.

Those skilled in the art will also be able to select a suitable solvent to be used in the preferred method of stripping the resin from the body at the desired time prior to the electroless metal deposition step. Water soluble resins can, of course, be stripped with water and organic soluble resins may be stripped with appropriate organic solvents. Merely by way of illustration, the polyethylene glycols may be removed by stripping with water, and a moderately alkaline aqueous solution is preferred for the polyacrylic acid resins. The acrylic ester resins, on the other hand, may be stripped with an organic solvent, such as esters, e.g., ethyl acetate, butyl acetate, butyl lactate, dibutylphthalate, and the like; ether alcohols, such as cellosolve acetate, carbitol acetate, and the like, aromatic hydrocarbons, such as toluene and xylene, chlorinated hydrocarbons, such as ethylene dichloride, and 1,1,1-trichloroethane, and the like. The resinous substrate is least affected if a chlorinated hydrocarbon or a blend of methyl cellosolve and diacetone alcohol is used.

Other methods which are suitable for stripping certain protective coating materials from the surface of the article include hand stripping, perferably after using a knife in lifting an edge of the film enough to provide a grip for the hand, as well as moderate heating to melt off a "hot melt" coating.

When used herein and in the appended claims, the term "body having a wettable porous surface" contemplates plastic materials, e.g., molded articles, laminated articles, resin-coated articles and the like, which are resinous in their entirety or those having at least a portion of their outwardly presented surface wettable and porous in nature; and also certain ceramics (e.g., steatite) that are capable of having their surfaces activated by a hydrogen fluoride treatment for subsequent electroless metal deposition. The interior of a resin-coated substrate can be metallic, such as aluminum, iron, copper, etc. or non-metallic, such as paper, cardboard, cloth, glass, porcelain, steatite, and the like.

For illustration, the body can be molded from a thermoplastic resin of natural or synthetic origin, such as natural rubber or rosin, amber, celluloid, or polystyrene and modified polystyrenes, or the acrylonitrile-butadiene-styrene terpolymers (ABS resins), cellulose acetate, nylons, epoxies, polyesters, phenolics, polytetrafluoroethylene, polyethylene and polypropylene, butyl rubber, polycarbonates, polyphenylene ethers, polysulfones, and the like. As will be seen in one aspect, the present process is particularly applicable in processes involving metallization of the commercially important class of ABS plastics. The high adhesion values on ABS resins provided, for example in the processes of co-pending Ser. No. 314,748 will be retained after using the present improved process. Other resins are also useful as the resinous surface to be metallized, as are polyvinyl chlorides, polyurethane rubbers, poly(-methyl methacrylates), styrene-acrylonitrile copolymers (SAN) and the like, alone, or combined with ABS and similar materials.

Included among bodies having an outwardly presented resinous surface are items such as fluidized bed resinous coated metallic substrates in which the resin layer can be epoxy, phenolic or similar material, in a layer thick enough to provide insulation, if necessary. Such bases are described in U.S. Pat. No. 3,259,559, which is incorporated herein by reference.

In addition, the body having a resinous surface can comprise an insulating core and a resinous layer adhered to the core by heat-curing thereon. Examples of these are well known and many are described in U.S. Pat. No. 3,625,758, which is incorporated herein by reference, and elsewhere. The insulating base in such bodies can be, for example, a phenolic-paper, epoxy-paper, epoxy-fiberglas, polyester-fiberglas, or similar laminate. On this insulating base can be provided an adherent resinous layer which may also include finely divided particles of oxidizable rubber. The adherent resinous layer will be present, for example, in a thickness — when dry — of about 20 to 30 microns, or more. Such resinous layers can comprise, for example, an epoxy resin, a phenol-formaldehyde condensation product, a nitrile rubber in a curable composition, and the like.

By way of further illustration, the resinous surface layer can comprise a phenolic, polyepoxide, melamine, polyacrylic, polyester, natural rubber or curable polystyrene resin, and the like, which has been applied to a permanent base in a partially hardened state by a transfer coating process and then cured. In such a process, which is described in more detail in co-pending application Ser. No. 270,660 filed July 11, 1972, which is incorporated herein by reference. A detailed procedure employing the transfer technique will be exemplified hereinafter.

Among the preferred features of this invention are the protective coating bodies having an activated resinous surface, which has been pretreated to render the surface permanently polarized and wettable. Such treatments involve dipping or spraying the resinous layer with an agent such as dimethyl formamide, dimethyl sulfoxide, N-methyl-2-pyrrolidone, ketones, halogenated hydrocarbons and mixtures thereof or the like, followed by rinsing in water or a mixture of ethyl acetate and trichloroethylene and the like. This treatment produces a polarized, wettable surface which is especially amenable to treatment with the aforementioned oxidizing solutions then with a neutralizing agent. The procedure is described in the above-mentioned co-pending U.S. Ser. No. 20,106, now abandoned, which is incorporated herein by reference, and in several of the working examples hereinafter.

A further preferred feature of this invention comprises the protective coating of a body having an activated surface comprising an adherent resinous layer, the layer having uniformly dispersed therein finely divided particles consisting of oxidizable and degradable synthetic or natural rubber which have then been treated with a strong oxidizing agent such as chromosulfuric acid or permanganate solutions. Such bases are disclosed in Stahl, et al, U.S. Pat. No. 3,625,758, and in the said co-pending application Ser. No. 314,748, which are incorporated herein by reference, and working examples are included hereinafter to illustrate these embodiments.

Those skilled in the art of electroless metal deposition will understand that if the surface is not inherently catalytic to the deposition of electroless metal (e.g., there is no catalyst such as copper oxide, etc., included in the resinous body), then after pretreatment to promote the activation of bonding sites, it will be necessary to include a step for rendering the activated surface catalytic to the reception of electroless metal, prior to contacting with the electroless metal deposition bath. Among the well known methods are sequential processes such as by immersing the body first in a solution of stannous ions followed by immersing the so-treated body in an acidic solution of precious metal, e.g., palladium or platinum, ions. Other suitable processes are described in U.S. Pat. No. 3,011,920 and U.S. Pat. No. 3,672,938, which are incorporated herein by reference.

On the other hand, the body can be catalytic throughout its entire mass to the deposition of electroless metal, such as by containing a uniform dispersion of catalytic fillers as is shown in U.S. Pat. No. 3,629,185, which is incorporated herein by reference. Drilling holes into such bases provides catalyzed walls without the need for separate sensitization steps.

The thus-activated (and catalyzed, if necessary) article of this invention may then be metallized by electroless deposition in known manner after its protective coating has been removed as described herein.

DESCRIPTION OF SPECIFIC EMBODIMENTS

The numbered examples hereinafter illustrate the process of the present invention and describe the metallized articles prepared thereby. They are illustrative and are not to be construed to limit the invention in any manner whatsoever. For convenience, the compositions of certain agents employed in the examples may be tabulated in the following manner.

Neutralizing and Sensitizing Solutions

| Component | Formulas | | | |
|---|---|---|---|---|
| | A | B* | C | D |
| $PdCl_2$–g. | — | 1 | — | 1 |
| $SnCl_2$–g. | 30 | 60 | 100 | — |
| HCl (37%) –ml. | 330 | 100 | 55 | 40 |
| water (to make) –ml. | 1000 | 1000 | 1000 | 1000 |

*A palladium chloride-stannous chloride complex according to U.S. Pat. No. 3,672,938.

Protective Coating Solutions

| Component | Parts by weight | |
|---|---|---|
| | Bath E | Bath F |
| CARBOWAX 6000 polyethylene glycol 6000–7500 av. mol. wt. 58–62°C. freezing range (Product of Union Carbide Corp.) | 100 | 100 |
| isopropanol | 200 | 200 |
| water | 100 | 100 |
| TRITON X-100 nonionic wetting agent (Rohm & Haas Co. Product) | 2 | — |
| surfactant 6G (Product of Olin Corp.) | — | 2 |

Electroless Copper Deposition Formulations

| Component | Solution | |
|---|---|---|
| | H | I |
| copper sulfate pentahydrate | 15 g. | 10 g. |
| sodium potassium tartrate (Rochelle Salt) | 45 g. | — |
| trisodium N-hydroxyethylene diaminetriacetate (41% aqueous) | — | 15 g. |
| formaldehyde (37%) | 10 ml. | 6 ml. |
| sodium cyanide | 10 mg. | 10 mg. |
| sodium hydroxide | to pH 13.5 | 2 g. |
| surfactant 6G (Olin) | — | 1 g. |
| water (to make) | 1 l. | 1 l. |

Rubber-Resin Formulations

| Component | Parts by weight | |
|---|---|---|
| | J* | K |
| methyl ethyl ketone | 415 | x** |
| cellosolve acetate | 2375 | y** |
| butyl carbitol | 1830 | z** |
| nitrile rubber, liquid | 590 | 350 |
| nitrile rubber, in lumps | 350 | 590 |
| thermosetting oil-soluble phenol resin | 350 | 350 |
| epoxy resin (epichlorohydrin derivative) | 400 | 400 |
| silica, finely divided | 300 | 300 |
| Viscosity—cps. at 22°C. | approx. 600 | approx. 12,000 |

*U.S. 3,625,758 Example II
**Enough solvent mixture in an x:y:z weight ratio of about 1:5.7:4.4 is added to provide a solution viscosity of 12,000 cps.

EXAMPLE 1

This example illustrates using a strippable film-forming resinous layer to prevent loss of adhesion between an activated resinous substrate and a metal deposit, even when the resinous layer is applied to the substrate long after activation.

An automobile radiator grille molded of a butadiene-acrylonitrile-styrene graft copolymer including minor proportions of stabilizers, plasticizers and pigments (Cyclolac EP 3530, a product of the Borg Warner Corporation) is subjected to the following procedure:

a. clean the surface for 5 minutes at 70°C. in water containing 50 g./l. of trisodium phosphate;
b. rinse with water;
c. immerse for 5 minutes at about 20°–25°C. with mild agitation in a solution comprising:

| | |
|---|---|
| methyl ethyl ketone | 200 ml. |
| nonionic wetting agent | |

-Continued

| | |
|---|---|
| (TRITON X-100) | 1 ml. |
| water (to make) | 1000 ml. |

d. promote the activation of bonding sites by immersion for 10 min. at 70°C. in a solution comprising:

| | |
|---|---|
| potassium permanganate | 40 g. |
| potassium monobasic phosphate, $KH_2PO_4$ | 40 g. |
| water (to make) | 1000 ml. |
| pH | 4.2 |

e. rinse in still (not running) water;
f. neutralize for 5 min. at 20°–25°C. in Formula A solution;
g. immerse 2 min. at 20°–25°C. in water containing 300 ml./l. of 37 percent hydrochloric acid;
h. rinse with flowing water at 20°–25°C.;
i. immerse the activated grille for 2 to 4 min. in protective coating Bath E and drain; and
j. the article is oven dried at 70°C. for 5 min. to evaporate the solvent and level the coating.

After substantial storage, the coated substrate prepared for the deposition of an electroless metal layer is as follows:

k. dip in hot water at 60°C. for 5–10 minutes to strip the resinous film of polyethylene glycol;
l. rinse in cold water for 5 to 10 minutes;
m. immerse for 10 min. in Formula B sensitizer bath; and
n. rinse with water.
o. Then the article is immersed for about 50 hours at 55°C. in the Formula H electroless copper deposition solution to build up a layer of ductile electroless copper of about 1 mil thickness;
p. rinsed with water and dried.

The peel strength of the copper layer is in the range of 8 to 12 lbs. per inch of width.

EXAMPLE 2

The procedure of Example 1 is repeated, substituting for the polyethylene glycol, the following water-soluble film-forming resins: polyacrylamide, methyl cellulose, hydroxyethyl cellulose, polyvinyl alcohol, polyvinyl pyrrolidone, methyl vinyl ether-maleic anhydride copolymer, carboxymethyl cellulose, gelatin, casein and polyacrylic acid. With polyacrylic acid it is useful to add either ammonia or a small amount of alkali into the water in steps (k) and (l) to facilitate stripping.

EXAMPLE 3

This illustrates the use of a film-forming resin in a non-aqueous system.

The procedure of Example 1 is repeated through step (h), followed by:

i. immersing the article for 2 to 4 min. in a protective coating Bath G comprising:

| | |
|---|---|
| poly(methyl methacrylate) 30% solids in cellulose acetate, sp.gr. 1.03, visc. 895–995 cps. at 25°C., refractive index of clear film 1.488 * | 75 g. |
| 1,1,1-trichloroethylene (to make) | 1000 ml. |

* ACRYLOID A-10, Rohm & Haas Co.

j. air drying then baking the article for 10–15 min. at 130°C.

This protected substrate even after prolonged storage and handling can be stripped by:

k. immersing the substrate in 1,1,1-trichloroethylene for 10 to 15 minutes; and
l. air drying to produce a base eminently suitable for the electroless deposition of copper and other metals.

Instead of poly(methyl methacrylate), poly(ethyl acrylate) can be used and instead of 1,1,1-trichloroethylene, ethyl acetate can be used, with substantially the same results.

EXAMPLE 4

This illustrates the use of a strippable coating to prevent deactivation of the bonding sites during printed circuit fabrication (cutting panel size, drilling holes, etc.).

a. An epoxy glass laminate 0.005 in. thick (SYNTHANE FB 620 produced by Taylor Corp.) is dipped in a mixture of 1:1 by volume of dimethyl formamide and 1,1,1-trichloroethane for 30 sec. at 20°–25°C.;
b. air dried and drained for 2 min.;
c. the activation of bonding sites is promoted by dipping for 3 to 5 minutes at 45°C. in a solution comprising:

| | |
|---|---|
| chromic acid, $CrO_3$ | 100 g. |
| concentrated sulfuric acid | 300 g. |
| water (to make) | 1000 ml. |

d. rinsing in still (not running) water;
e. neutralizing for 2 minutes in a solution comprising:

| | |
|---|---|
| sodium bisulfite | 20 g. |
| concentrated sulfuric acid | 50 g. |
| water (to make) | 1000 ml. |

f. rinsing in overflow water for 4 min.;
g. dipping in hot water (70°C.) for 2 min.;
h. rinsing in cold water for 4 min.;
i. coating the laminate by immersion in protective coating Bath F for 2 to 4 minutes and draining; and
j. oven drying for 5 min. at 70°C. to evaporate solvent and level the coating layer.

The board is then subjected to fabrication operations which include cutting panel to size and drilling holes.

The protective coating is removed and a thin adherent metallic layer is applied to the active surface by:

k. dipping in hot water at 70°C. for 5 to 10 min.;
l. rinsing in cold water for 5 to 10 min.;
m. dipping for 2 min. in a 50–50 by volume mixture of concentrated hydrochloric acid and water;
n. immersing in Formula B sensitizer solution for 10 min.;
o. rinsing with water; and
p. immersing at 55°C. in Formula I electroless copper deposition solution to build up a layer of electroless copper of the desired thickness.

Instead of the copper bath, a nickel-hypophosphite bath such as is described in Brenner, Metal Finishing, November 1954, pages 68–76, can be used to produce an adherent electroless nickel layer, or a gold bath, such as is described in U.S. Pat. No. 2,976,181, can be used to produce an adherent electroless gold layer. Likewise, silver, cobalt and other Group IB and VIII electroless metals can be deposited from baths well known to those skilled in this art.

EXAMPLE 5

This example illustrates the application of the present process to a base having an adherent resinous layer thereon containing uniformly dispersed oxidizable and degradable rubber particles.

a. A phenol formaldehyde paper-based laminate is coated by dipping it into rubber-resin Formulation J;
b. hardening the coated boards in a fresh air circulating oven at 155°C. for 3½ hours before cooling them;
c. promoting the activation of bonding sites by immersion for 5 minutes at 50°C. in a solution comprising:

| | | |
|---|---|---|
| potassium permanganate | 40 | g. |
| potassium carbonate | 40 | g. |
| water (to make) | 1000 | ml. |
| ph | 11.0 | |

d. rinsing in still (not running) water;
e. neutralizing (optional) for 5 min. at about 20°–25°C. in a solution comprising:

| | | |
|---|---|---|
| hydroxylamine | 50 | g. |
| hydrochloric acid (37%) | 300 | ml. |
| water (to make) | 1000 | ml. |

f. rinsing with flowing water at 20°–25°C.;
g. coating by immersion in protective coating Bath F. for 2–4 minutes and draining; and
h. oven drying for 5 min. at 70°C. to evaporate solvent and level the coating layer.

This board can be stored, transported and subjected to fabrication operations, e.g., cutting to panel size, punching and drilling, without affecting its active bonding sites.

The board of this example is stripped of its coating, sensitized and metallized in the following procedures:

i. remove protective coating by dipping in hot water at 60°C. for 5 to 10 minutes;
j. rinse in cold water for 5 to 10 minutes;
k. immerse in Formula C neutralizing solution;
l. rinse in water;
m. immerse in Formula D sensitizing solution;
n. rinse with water; and
o. immerse at 55°C. in an electroless copper deposition Bath H for about 50 hours to deposit a ductile electroless copper layer about 1 mil thick.

The metallized laminate is tested for adhesion of metal to resinous layer and the peel strengths range from 10 to 18 lbs.

EXAMPLE 6

This illustrates application of the present process to metallization of a base having a resin-rich outer layer applied by the transfer coating process of co-pending U.S. Ser. No. 270,660 and sensitized with a precious metal.

a. A transfer base comprising a polyethylene-coated paper is coated and dried in an apparatus via roll to roll processing with a layer of the aforementioned hardenable rubber-resin base composition K.
b. 3 by 4 foot sheets are cut off the roll and arranged in a stack with a plurality of phenolic-paper or glass-epoxy prepreg core stock sheets so that the rubber-resin layer is in direct contact with the core stock;
c. the composite is laminated under conventional conditions (phenolic prepreg — 1,000 to 1,500 psi at 340°F. for 45 minutes; epoxy prepreg — 200 to 275 psi at 340°F. for 15 to 30 minutes).

Panels cut from the sheet laminates are processed into printed circuit boards as follows:

d. any required hole pattern is produced;
e. the transfer base material (polyethylene-coated paper) is peeled off;
f. the surface is promoted for the activation of bonding sites by immersion for 10 min. at 70°C. in a solution comprising:

| | | |
|---|---|---|
| potassium permanganate | 40 | g. |
| potassium peroxydiphosphate, $K_4P_2O_8$ | 40 | g. |
| water (to make) | 1000 | ml. |

g. the surface is rinsed with water;
h. the surface is sensitized in two steps, first by treating for 5 min. at 20°–25°C. in a Formula A solution;
i. the base is rinsed and to complete sensitization, it is immersed in a Formula D solution;
j. the article is coated by immersion in a protective coating Bath F for 2 to 4 minutes and drained; and
k. oven dried for 5 min. at 70°C. to evaporate the solvent and level the coating layer.

This board can be stored, transported and subjected to fabrication operations without affecting its activated bonding sites and sensitized catalytic surface.

The board is stripped and metallized by:

l. removing protective coating by dipping in hot water at 60°C. for 5 to 10 minutes;
m. rinsing in cold water for 5 to 10 minutes;
n. drying;
o. a conventional background resist is applied to the face of the board;
p. electroless copper is deposited on the board from a conventional bath (e.g., U.S. Pat. No. 3,625,758, Example V) to the desired thickness, to produce the conductor pattern;
q. the resist is stripped by applying a solvent, and
r. the finished circuit board is post-cured for 30 minutes at 160°C.

EXAMPLE 7

This illustrates application of the present process to a base which is catalytic throughout and which presents outwardly a resinous surface, in which the bonding is achieved by providing a permanently polarized, wettable surface without any adhesive being needed.

A catalytic filler is prepared according to U.S. Pat. No. 3,629,185, which is incorporated herein by reference, by:

a. treating aluminum silicate powder (ASP 405) with a Formula C solution;

b. rinsing with water;
c. treating with a Formula D solution;
d. rinsing with water, and
e. spray drying.

A laminate is prepared by mixing the catalytic filler into a laminating varnish comprising an amine-catalyzed bisphenol-A epichlorohydrin condensation product at 12 percent filler based on the resin solids, impregnating glass cloth with the varnish, advancing the cure to the "B-stage," cutting the impregnated cloth to size, laying up a plurality of sized prepreg sheets and consolidating under heat and pressure (e.g., 200 to 275 psi at 340°F. for 15 to 30 minutes) to produce the catalytic laminate.

Activated bonding sites are produced on the surface of the laminate by a sequence comprising:

f. immersing in dimethyl formamide for 5 min. to pretreat the outwardly presented resinous surface;
g. rinsing in running water for 2 minutes;
h. promoting the activation of bonding sites by immersion for 10 min. at 70°C. in the permanganate solution of step (d) in Example 1;
i. and rinsing in still (not running) water.

A protective coating is produced by j. immersion in coating Bath F for 2 to 4 minutes and draining;
k. then oven drying for 5 min. at 70°C. to evaporate the solvent and level the coating layer.

This board can be stored, transported and subjected to fabrication operations without affecting its activated bonding sites and catalytic interior.

The board of this example is prepared for metallization, as follows:

l. removing protective coating by dipping in hot water at 60°C. for 5 to 10 minutes;
m. rinsing in cold water for 5 to 10 minutes, and
n. drying.

Obviously, other modifications will suggest themselves to those skilled in the art in the light of the above teachings.

It has been demonstrated that the present invention provides means to protect an activated substrate from abuses during handling such as cutting, stacking, drilling and other fabrication operations which tend to mar surfaces, giving rise to defective parts. Chemically prepared and other specially conditioned surfaces are very susceptible to damage of the type described. In addition, it is an objective of this invention to provide a method to insure the integrity of the sensitive, activated surfaces during storage. The protected articles and methods described herein can be used without altering subsequent peel strengths and adhesion values.

The invention is not limited to any particular articles, such as printed circuit boards, or to the specific steps and methods described.

We claim:

1. An article of manufacture comprising a body having an outwardly presented wettable porous surface having active bonding sites for electroless metal deposition thereon, and a strippable protective coating on said surface, said strippable protective coating comprising a continuous film-forming resinous layer, said resinous layer being resistant to the penetration of external forces and substances which tend to deactivate the bonding sites and being cleanly strippable from said body.

2. An article as defined in claim 1 wherein said continuous film-forming resinous layer comprises polyacrylamide, polyacrylic acid, methyl cellulose, hydroxyethyl cellulose, polyvinyl alcohol, polyethylene oxide, polyethylene glycol, polyvinyl pyrrolidone, methyl vinyl ether-maleic anhydride copolymer, carboxymethyl cellulose, gelatin, casein or poly (acrylic or methacrylic) esters.

3. An article as defined in claim 1 wherein said outwardly presented surface having active bonding sites is permanently polarized.

4. An article as defined in claim 3 wherein said body is catalytic throughout its entire mass to the deposition of electroless metal from an electroless metal bath in contact therewith.

5. An article as defined in claim 1 wherein said outwardly presented surface having active bonding sites is a microporous resinous surface.

6. An article as defined in claim 1 wherein said outwardly presented surface having active bonding sites is a resin-rich surface layer of controlled thickness.

7. An article as defined in claim 6 wherein said resin-rich surface layer is an adhesive layer.

8. An article as defined in claim 1 wherein said outwardly presented surface is catalytic to the deposition of electroless metal from an electroless metal deposition bath in contact therewith.

9. In a process for metallizing a body having an outwardly presented wettable porous surface, said surface having been treated with an agent to promote the formation of active bonding sites for electroless metal deposition thereon, the improvement comprising protecting said surface by coating the activated outwardly presented surface with a continuous film-forming resinous layer, said layer being resistant to the penetration of extraneous forces and substances which tend to deactivate the bonding sites and being cleanly strippable from said body.

10. A process as defined in claim 9 wherein said continuous film-forming resinous layer comprises polyacrylamide, polyacrylic acid, methyl cellulose, hydroxyethyl cellulose, polyvinyl alcohol, polyethylene oxide, polyethylene glycol, polyvinyl pyrrolidone, methyl vinyl ether-maleic anhydride copolymer, carboxymethyl cellulose, gelatin, casein or poly (acrylic or methacrylic) ester.

11. A process as defined in claim 9 wherein said outwardly presented surface having active bonding sites is permanently polarized.

12. A process as defined in claim 11 wherein said body is catalytic throughout its entire mass to the deposition of electroless metal from an electroless metal bath in contact therewith.

13. A process as defined in claim 9 wherein said outwardly presented surface having active bonding sites is a microporous resinous surface.

14. A process as defined in claim 9 wherein said outwardly presented surface having active bonding sites is a resin-rich surface layer of controlled thickness.

15. A process as defined in claim 14 wherein said resin-rich surface layer is an adhesive layer.

16. A process as defined in claim 9 wherein said activated outwardly presented surface is catalytic to the deposition of an electroless metal from an electroless metal deposition bath in contact therewith.

17. A process as defined in claim 9 wherein said film-forming resinous layer is thereafter removed from said outwardly presented surface by means including the application of a solvent for the film-forming resinous material to said activated outwardly presented surface prior to electroless metal deposition.

* * * * *

PO-1050
(5/69)

UNITED STATES PATENT OFFICE
CERTIFICATE OF CORRECTION

Patent No. 3,819,394 Dated June 25, 1974

Inventor(s) Frederick W. Schneble, Jr. et al

It is certified that error appears in the above-identified patent and that said Letters Patent are hereby corrected as shown below:

On the cover page, left hand column, lines 2, 5 and 20, "Schnebel" should read -- Schneble --.

Signed and sealed this 19th day of November 1974.

(SEAL)
Attest:

McCOY M. GIBSON JR.
Attesting Officer

C. MARSHALL DANN
Commissioner of Patents